US009225702B2

(12) United States Patent
Hallam-Baker

(10) Patent No.: US 9,225,702 B2
(45) Date of Patent: Dec. 29, 2015

(54) TRANSPARENT CLIENT AUTHENTICATION

(71) Applicant: Verisign, Inc., Reston, VA (US)

(72) Inventor: Phillip Martin Hallam-Baker, Medford, MA (US)

(73) Assignee: VERISIGN, INC., Reston, VA (US)

( * ) Notice: Subject to any disclaimer, the term of this patent is extended or adjusted under 35 U.S.C. 154(b) by 88 days.

(21) Appl. No.: 13/846,106

(22) Filed: Mar. 18, 2013

(65) Prior Publication Data

US 2013/0219477 A1 Aug. 22, 2013

Related U.S. Application Data

(63) Continuation of application No. 12/561,647, filed on Sep. 17, 2009, now Pat. No. 8,402,519.

(60) Provisional application No. 61/105,962, filed on Oct. 16, 2008.

(51) Int. Cl.
*G06F 15/16* (2006.01)
*H04L 29/06* (2006.01)

(52) U.S. Cl.
CPC .............. *H04L 63/08* (2013.01); *H04L 63/061* (2013.01)

(58) Field of Classification Search
CPC ...................................................... H04L 63/08
USPC ............................................................ 726/5
See application file for complete search history.

(56) References Cited

U.S. PATENT DOCUMENTS

| 5,351,293 | A | 9/1994 | Michener et al. |
| 2004/0088544 | A1 | 5/2004 | Tariq et al. |
| 2004/0157640 | A1* | 8/2004 | Pirskanen et al. .......... 455/552.1 |
| 2005/0027987 | A1 | 2/2005 | Neufeld et al. |
| 2005/0223230 | A1* | 10/2005 | Zick .............................. 713/171 |
| 2005/0287990 | A1* | 12/2005 | Mononen et al. ............. 455/411 |
| 2006/0165060 | A1 | 7/2006 | Dua |
| 2006/0168446 | A1 | 7/2006 | Ahonen et al. |
| 2007/0130343 | A1 | 6/2007 | Pardo-Blazquez et al. |

(Continued)

OTHER PUBLICATIONS

Young, Lee W., International Search Report and Written Opinion, issued by International Search Authority, WIPO, for PCT/US09/60781, dated Dec. 1, 2009, 11 pages.

Dierks et al., "The TLS Protocol, Version 1.0," Request for Comments (RFC) 2246, The Internet Society, Network Working Group, Jan. 1999, 75 pages.

(Continued)

*Primary Examiner* — Peter Shaw
(74) *Attorney, Agent, or Firm* — MH2 Technology Law Group, LLP

(57) ABSTRACT

A system and method for authenticating an application (client) to a server or service. During a registration phase, an application that requests access to a service can receive a service identifier, which it can authenticate. The application can generate and send to the server or service an application-service key that is based upon the authenticated service identifier and a secret application key; a service-application identifier that can be based upon the authenticated service identifier and an application identifier; and a registration nonce, all of which can be stored at the server. During the authentication phase, the client can send to the server the application-service identifier, which the server can use to lookup the stored registration data. The server can send the registration nonce to the client, which can compute a proof of possession of the service-application key and send to the server. The server can compute its own version of this key and compare it to the received key. If they correspond, then the client is authenticated.

18 Claims, 5 Drawing Sheets

(56) References Cited

U.S. PATENT DOCUMENTS

| 2007/0180503 | A1 | 8/2007 | Li et al. | |
|---|---|---|---|---|
| 2008/0022374 | A1 | 1/2008 | Brown et al. | |
| 2008/0028206 | A1 | 1/2008 | Sicard et al. | |
| 2008/0133929 | A1* | 6/2008 | Gerhmann et al. | 713/179 |
| 2009/0300352 | A1* | 12/2009 | Schneider | 713/168 |

OTHER PUBLICATIONS

Dierks et al., "The Transport Layer Security (TLS) Protocol, Version 1.2," Request for Comments (RFC) 5246, The Internet Society, Network Working Group, Aug. 2008, 98 pages.

Dierks et al., "The Transport Layer Security (TLS) Protocol, Version 1.1," Request for Comments (RFC) 4346, The Internet Society, Network Working Group, Apr. 2006, 87 pages.

Neumann et al. "Kerberos: An Authentication Service for Computer Networks," University of Southern California/Information Sciences Institute (USC/ISI), USC/ISI Technical Report No. ISI/RS-94-399, Sep. 1994, 8 pages.

Kohl et al., "The Evolution of the Kerberos Authentication Service," University of Southern California/Information Sciences Institute (USC/ISI) and MIT, 1994, 15 pages.

Extended European Search Report dated Jul. 4, 2014, European Application No. 09821236.8 filed Oct. 15, 2009, pp. 1-9.

* cited by examiner

TRANSPARENT CLIENT AUTHENTICATION

RELATED APPLICATIONS

This application claims the benefit of U.S. patent application Ser. No. 12/561,647, filed Sep. 17, 2009, which claims priority to U.S. Application No. 61/105,962, filed Oct. 16, 2008, the entire contents of both of which are incorporated herein by reference in their entirety for all purposes.

BACKGROUND OF THE INVENTION

Internet crime, such as the practice of stealing authentication credentials through phishing, demonstrates the need for more effective and usable Internet authentication technology. Phishing can operate by presenting the user with a web page that appears to be a duplicate of, or associated with, a site to which the user provides its authentication credentials, such as a username and password. When the user provides its credentials to the phishing site, the credentials can be intercepted by the site operators and illicitly used on the real site to steal property, maliciously alter the user's account information, etc.

Although usernames and passwords don't require any special equipment to use, they are prone to being forgotten, written down in an unsecure way, stolen and guessed. While client-based cryptographic protocols such as HTTP Digest Authentication allow a proof of knowledge of the password to be substituted for the password itself, they only provide protection against phishing when used as the exclusive means of communicating the password value and suffer from some of the other disadvantages of passwords.

Some banks have deployed mechanisms that require additional authentication factors from a customer when the customer attempts to access its account from a new machine, i.e., a machine from which the user has not previously (or recently) attempted to access its account. While such systems can reduce fraud, they can impose burdensome requirements on users to log in. Customers who use a site infrequently often find that they are required to re-authenticate using their additional authentication factors almost every time they log in. Further, the additional factors may be easy to forget.

Blogs and other Web sites that provide access to user-generated content need lightweight authentication technologies that allow a reader to be authenticated to post a comment with as little extraneous interaction as possible. In such systems it is frequently sufficient to know that the entity seeking to post a new comment is the same entity that visited the site at an earlier time.

The HTTP 'cookie' mechanism can be used to provide a lightweight means of re-authenticating a client. But cookies are not designed for this particular purpose and typically lack the cryptographic security controls needed for reliable authentication. For example, plaintext cookie information is passed to the server rather than a proof of possession of the cookie information. Further, the cookie must be stored on the client as plaintext, which allows a 'cookie stealing' attack. Finally, cookies are used for many different purposes and clients are generally unable to distinguish cookies that support an authentication function from other types of cookies. Consequently, it is often impractical for a client to manage the expiry of authentication cookies separately from those used for other purposes. Expired authentication cookies could make it difficult for users to interact with sites that rely on cookie-based authentication.

SSL Client Authentication is a robust protocol that employs Public Key Cryptography (PKI) and X.509v3 client certificates. Despite the name, SSL Client Authentication is actually designed to authenticate the user of the browser rather than the browser (i.e., a client application) itself. Despite the advantages and widespread deployment of this protocol, it has not been widely used. This is because the SSL Client Authentication user interface can be difficult to use, particularly if the user has multiple client certificates. Also, it can be difficult to validate and provision a certificate to each end user.

What is needed is a client application authentication protocol that requires little or no user interaction and is very easy to use, requires the client to maintain little or no state information and that does not burden the server with the need to maintain much state information.

SUMMARY OF THE INVENTION

The present invention relates generally to authentication and in particular to a lightweight authentication protocol for easily re-authenticating an application.

A service identifier can be sent from a server to an application at a client. The server can receive an application-service identifier that is based upon the service identifier and an application identifier. The server can also receive from the application an application-service key that is based upon the server identifier and a secret application key at the client. The server can store the application-service identifier and the application-service key. When the application later communicates with the server for re-authentication, the server can send to the application the service identifier. The server can receive the application-service identifier that is based upon the service identifier and an application identifier. The server can send to the application a server nonce and receive from the application a proof of possession of the secret application key based upon the application-service identifier and the application-service key. The server can compute an expected value of the proof of possession and compare it with the proof of possession received from the application. If the expected proof of possession corresponds to the received proof of possession, then the server can determine that the application is authentic.

These and other embodiments of the invention are described in more detail in conjunction with the text below and attached figures.

DETAILED DESCRIPTION OF EMBODIMENTS OF THE INVENTION

In accordance with an embodiment of the present invention, a user computer running an application (also known as a "client") that has previously authenticated to a server can easily be re-authenticated.

Figure 1:
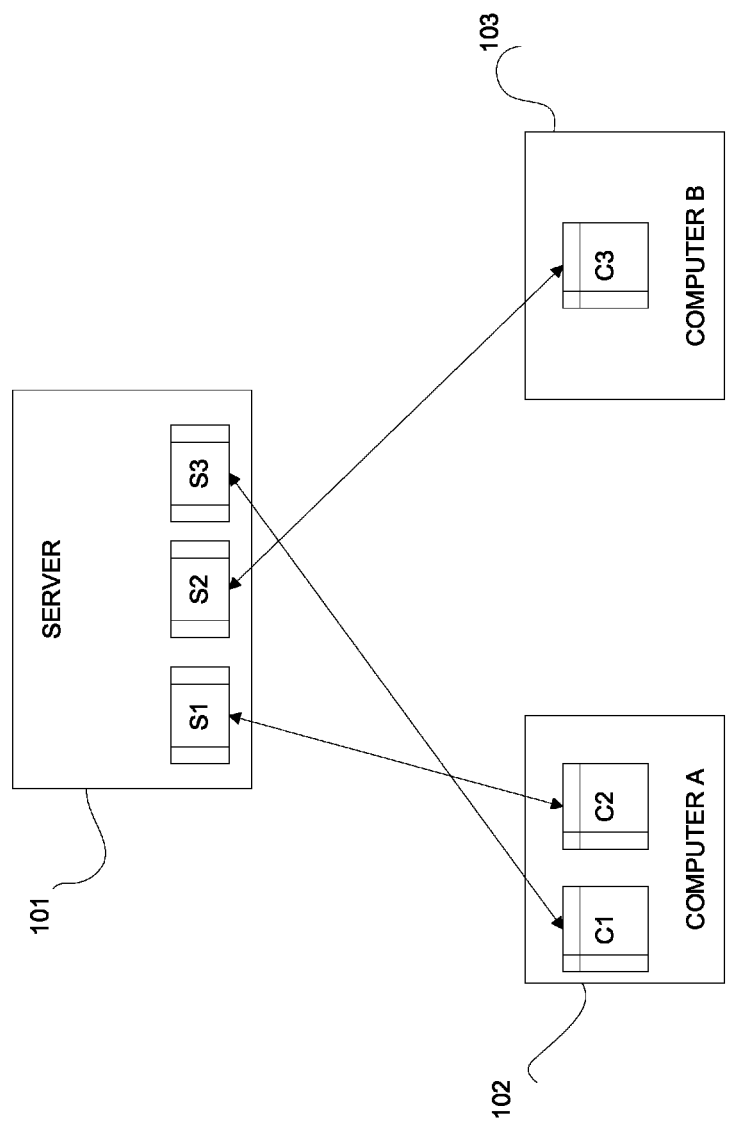
FIG. 1 shows a system in accordance with an embodiment of the present invention.

A system in accordance with an embodiment of the present invention is shown in FIG. 1. A server 101 provides various services S1, S2, S3, etc., to applications (also, "clients") C1 and C2 at Computer A 102 and C3 at Computer B 103. A client such as C1 can register for easy re-authentication in accordance with embodiments of the present invention to use a service such as S3 at server 101.

Server 101 can include one or more processors coupled to memory. The processors can include a general purpose microprocessor such as the Pentium processor manufactured by the Intel Corporation of Santa Clara, California; an Application Specific Integrated Circuit that embodies at least part of the method in accordance with an embodiment of the present invention in its hardware and firmware; a combination thereof; etc. Memory can be any device capable of storing electronic information, such as RAM, flash memory, a hard disk, an internal or external database, etc. Memory can store instructions adapted to be executed by processor to perform at least part of the method in accordance with the present invention. Memory can also store data such as identifiers and cryptographic key material. Memory can be tamper resistant to help prevent the unauthorized disclosure or modification of sensitive information. Memory can also store instructions adapted to be executed by the processor to provide services such as S1, S2 and S3 as shown in FIG. 1.

Computers A 102 and B can each include one or more processors coupled to memory. The processors can include a general purpose microprocessor such as the Pentium processor manufactured by the Intel Corporation of Santa Clara, Calif.; an Application Specific Integrated Circuit that embodies at least part of the method in accordance with an embodiment of the present invention in its hardware and firmware; a combination thereof; etc. Memory can be any device capable of storing electronic information, such as RAM, flash memory, a hard disk, an internal or external database, etc. Memory can store instructions adapted to be executed by processor to perform at least part of the method in accordance with the present invention. Memory can also store data such as identifiers and cryptographic key material. Memory can be tamper resistant to help prevent the unauthorized disclosure or modification of sensitive information. Memory can also store instructions adapted to be executed by the processor to run applications such as C1, C2 and C3 as shown in FIG. 1.

Each service S1, S2 and S3 can be associated with its own respective service identifier IS1, 1S2 and 1S3. These service identifiers can be stored in memory accessible to the server processor. Each application C1, C2 and C3 can be associated with its own respective application identifier IC1, IC2 and IC3. These application identifiers can be stored in memory accessible to the client processor.

Embodiments of the present invention can include a registration phase and an authentication phase. Both phases can be performed as a layered extension to a security protocol that provides server authentication and establishes a cryptographically secure shared secret (Kt) that can be used to establish an encrypted, integrity-checked (secure) channel between the client and the server, such as SSL, TLS, etc.

Figure 2:
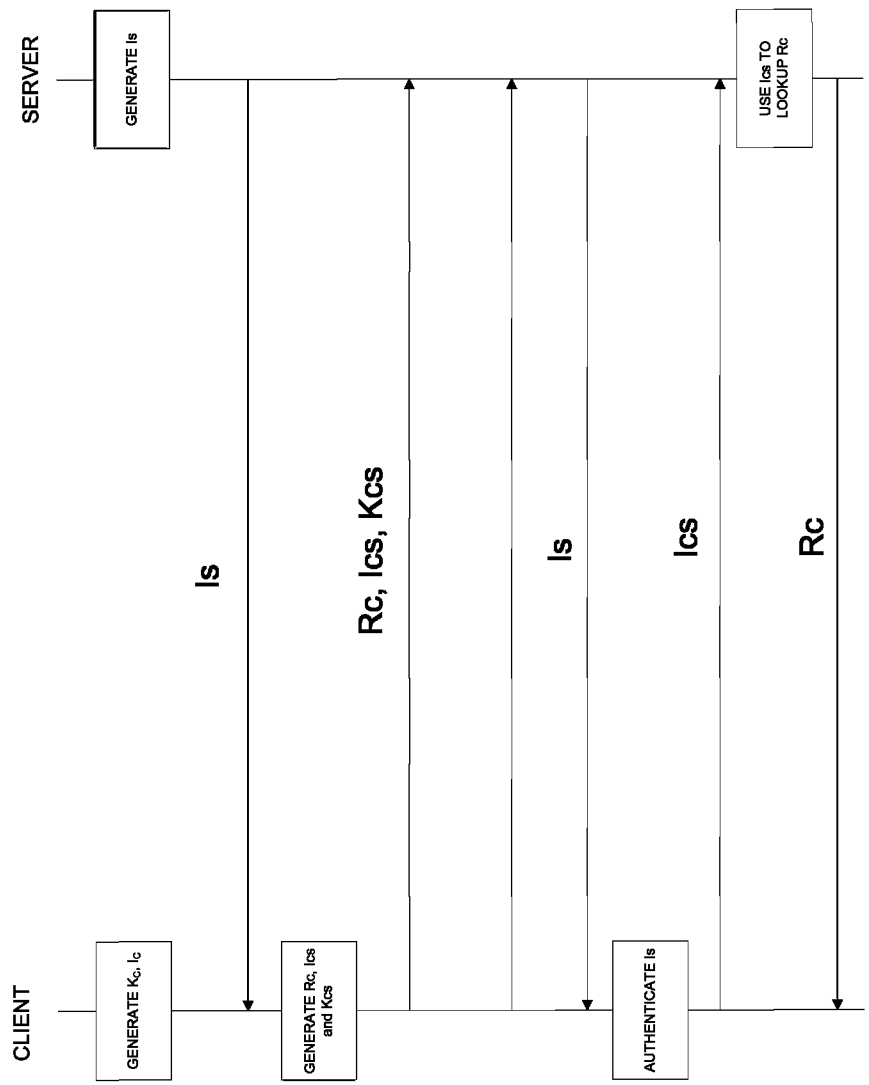
FIG. 2 shows a registration message flow in accordance with an embodiment of the present invention.

FIG. 2 shows a registration message flow in accordance with an embodiment of the present invention. A master secret key Kc and a master identifier Ic can be generated for or by an application at a client, e.g., during installation of the application, the first time the application is used by a user, etc. The master secret key can be sufficiently large to provide protection against a cryptanalytic attack and can be stored in tamper-resistant, protected memory to protect it from being stolen or improperly changed.

Each service at a server that supports client authentication in accordance with embodiments of the present invention can be issued a unique service identifier, Is. This identifier can be shared among multiple servers, e.g., managed by the same party.

During registration, the service identifier Is can be sent to the client. For example, the option to register for the re-authentication protocol and/or service identifier Is can be included as extensions to a X.509 certificate used to authenticate the server's public key. Alternatively, Is can be communicated in any other suitable way to the client. For example, over the secure channel, the client can send to the server a message requesting registration to a service. The server can send back to the client a message rejecting the request, or accepting the request. The message accepting the request can include service identifier Is.

The client can combine Is with an application identifier Ic to form an application-service identifier Ics that can uniquely correspond to the application-service pair. For example, the service identifier can be concatenated with the application identifier and then hashed or MACed to form an application-service identifier. That is, $$Ics=MAC(Is, Ic)$$

Examples of a Message Authentication Code ("MAC", a key-dependent hash) include HMAC, UMAC, CMAC, Poly1305 AES, etc. A message digest (i.e., a non-key dependent hash) may be used instead of a MAC in accordance with certain embodiments of the present invention. Examples of a message digest include MD5, SHA-1, SHA-2, etc. The client can also generate an application-service key Kcs based upon the master key Kc and other elements, such as the service identifier and a random nonce generated by the client (Rc), known as the registration nonce. Thus, for example, $$Kcs=MAC(Is+Rc, Kc)$$

Ics, Kcs and Rc can be sent to the server, which can store ("register") them in a database or other repository that can be used to track the client's access to the service.

Figure 3:
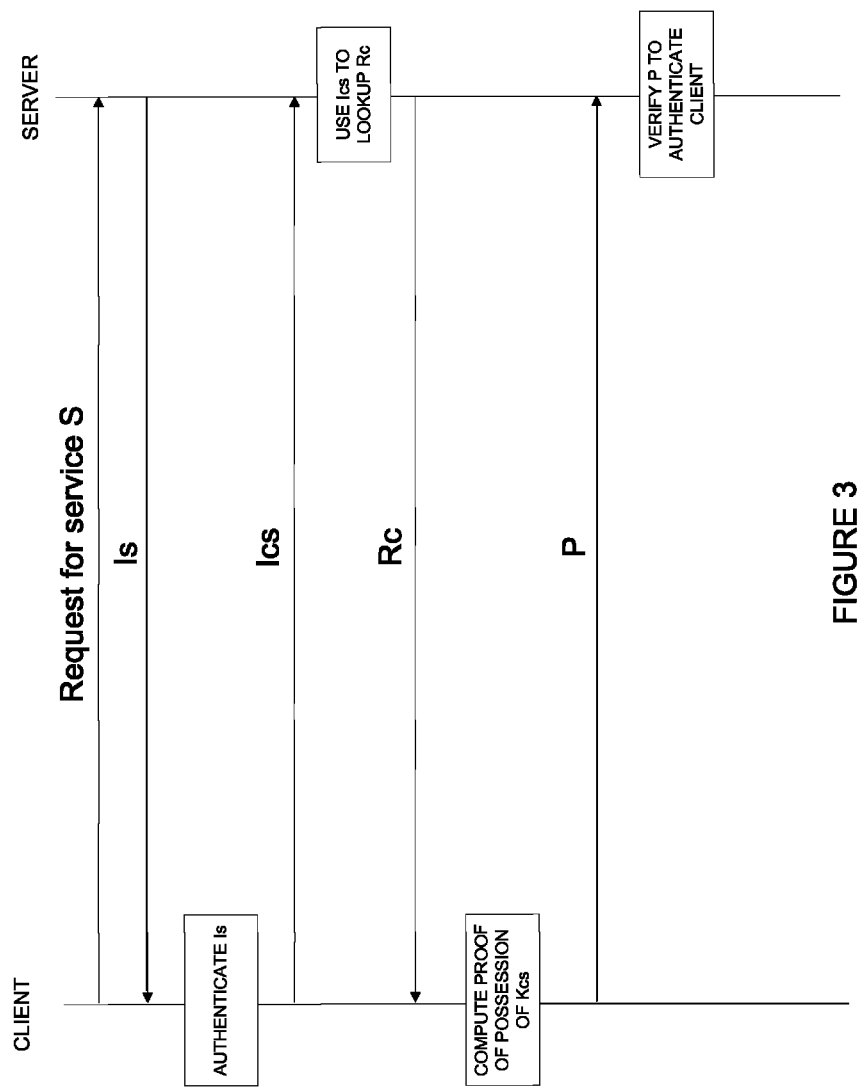
FIG. 3 shows an authentication message flow in accordance with an embodiment of the present invention.

FIG. 3 shows an authentication message flow in accordance with an embodiment of the present invention. When the client requests access to the service after completion of the registration phase, the server can use the information generated and stored during registration to easily authenticate the client. The client can obtain and authenticate the service identifier Is and then generate Ics, which can be based upon Is and Ic. For example, the client can generate $$Ics=MAC(Is, Ic)$$

Ics can be sent from the client to the server. The server can use Ics to lookup the registration nonce, Rc, used for the registration of the client to the particular service. The server can send Rc to the client.

The client can generate a proof of possession of Kcs based upon Ics, Rc and Kcs and send it to the server. For example, the client can generate proof of possession P, such that $$P=MAC(Ics+Rc, Kcs)$$

The server can generate its own version of P based upon the values of Ics, Rc and Kcs that were stored during the registration phase. It can then compare its own version of P with the version of P received from the client. If they correspond, then the client has been successfully authenticated. If not, the client has not been successfully authenticated.

Additional can be introduced into the protocol to prevent man-in-the-middle attacks. For example, the server can generate and send a random nonce value, ns, when it sends Rc to the client. Likewise, the client can generate an send a random nonce value, nc, when it sends P to the server. These nonces can be used in generating the proof of possession. For example, $$P=MAC(Ics+Rc+ns+nc, Kcs)$$

Nonces may be used as appropriate in accordance with embodiments of the present invention as would be understood by those of skill in the art.

Figure 4:
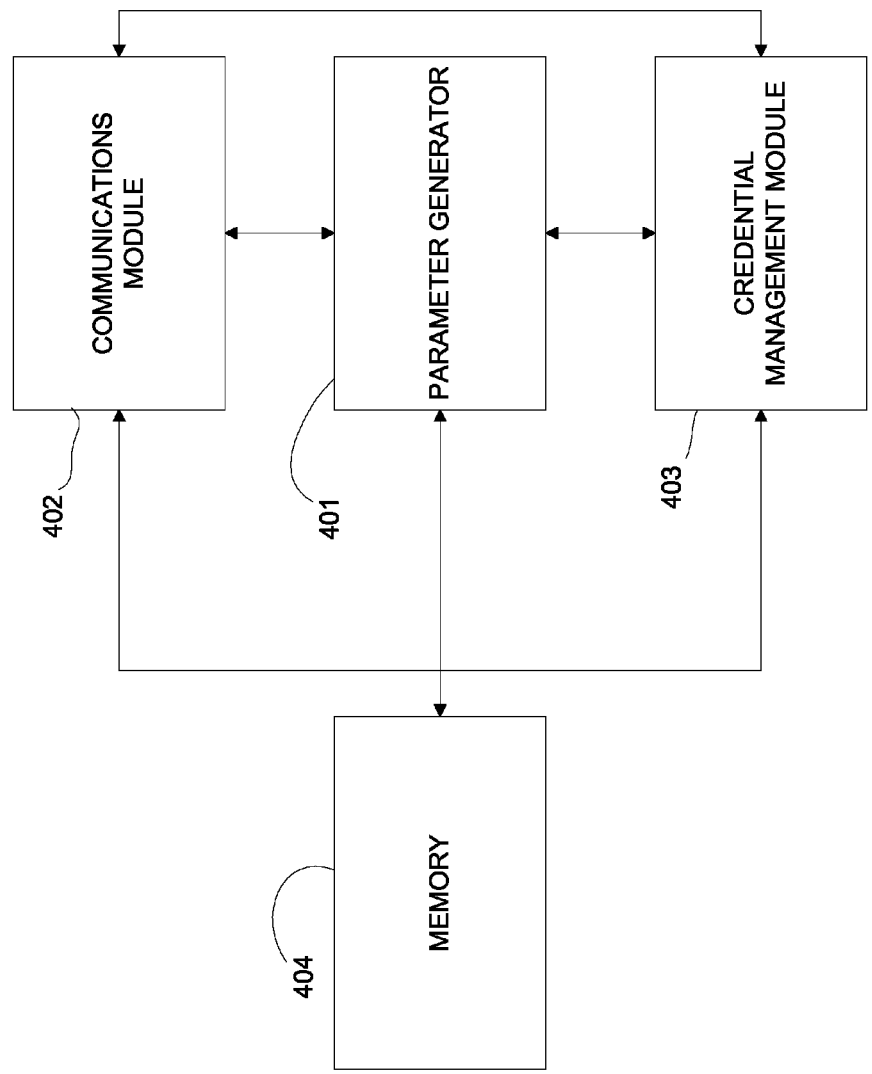
FIG. 4 shows a message flow diagram for registrar-only authentication and authorization in accordance with an embodiment of the present invention.

A registration system in accordance with an embodiment of the present invention is shown in FIG. 4. Parameter Generator 401 generates a service identifier, Is, for each service and is coupled to Communications Module 402, which can send the service identifier Is to a recipient. Communications Module 402 can also receive an application-service identifier, Ics, that is based upon the service identifier Is and an application identifier Ic and sends it to Credential Management Module 403, which can cause it to be store it in Memory 404. Communications Module 402 can also receive an application-service key Kcs that can be based upon the service identifier Is and a secret application key Kc and can cause it to be stored in Memory 404 such that Kcs is correlated with Ics.

Figure 5:
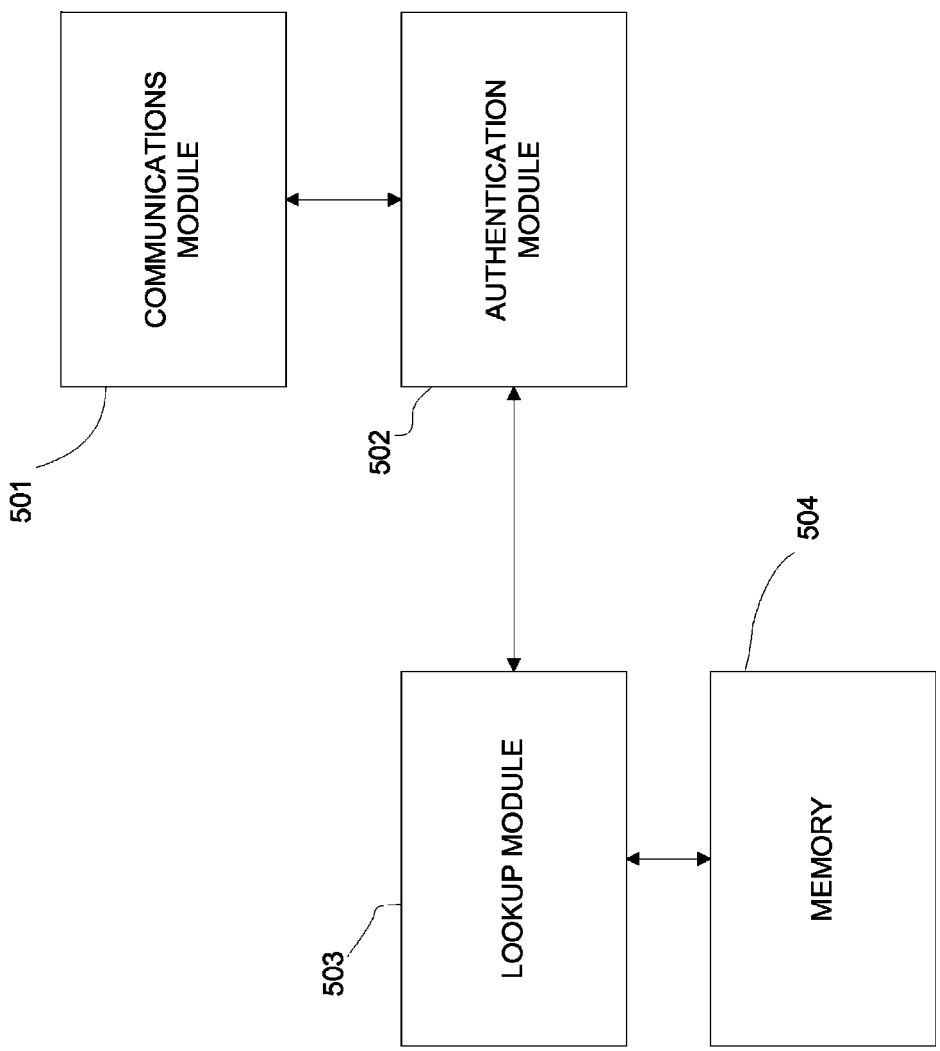
FIG. 5 shows a message flow diagram for authentication/authorization factor override in accordance with an embodiment of the present invention.

An authentication system in accordance with an embodiment of the present invention is shown in FIG. 5. Communications Module 501 can send a service identifier Is to a recipient, and receive an application-service identifier Ics based upon the service identifier Is and an application identifier Ic. Communications Module 501 can also receive a proof of possession P of the secret application key Kc based upon the application-service identifier Ics and the application-service key Kcs. Communications Module 501 can send the application-service identifier Ics and the received proof of possession P to the Authentication Module 502, which can be in communication with Lookup Module 503. Lookup Module 503 can retrieve from Memory 504 the application service key Kcs that is correlated with Ics and send Kcs to Authentication Module 502. Authentication Module 502 can compute an expected value of the proof of possession P' of the secret application key based upon the application-service identifier Ics and the application service key Kcs. Authentication Module 502 can compare the expected proof of possession P' with the received proof of possession P. If they correspond, then the application is determined to be authentic. If not, the authentication is deemed to have failed.

Other embodiments of the present invention can make use of variations that would be understood to those of skill in the art. For example, in the registration system shown in FIG. 4, Communications module 402 can receive a registration nonce Rc from an application and send it to Credential Management module 403, which can cause it to be stored in Memory 404 correlated with Ics and Kcs.

Likewise, Authentication Module 502 can generate a different server nonce ns for use in each communication sent from Communications Module 501 to an application.

Embodiments of the present invention can be implemented in any suitable device, such as a cell phone, a personal computer, a token, a RFID, a smart card, an embedded device, etc. An embedded devices usually includes a computer system adapted to perform one or a few dedicated functions and that is embedded as part of a complete device, which can include both electrical and mechanical components. Embedded devices can be used in factory control equipment, light switches, appliances, watches, etc. For example, embodiments of the present invention can be used to ensure that information obtained from, and instructions sent to, industrial control equipment are from and to authenticated sources. This can be implemented by embedding a processor and memory storing instructions adapted to be executed by the processor to perform at feast some of the steps of the present invention in an industrial machine. The embedded device can be used to authenticate the machine to a controller. Embedded devices in accordance with embodiments of the present invention can also be implemented in telecommunications switches, cell phones, routers, computer game consoles, digital cameras, DVD players, avionics, motors, control systems, medical systems, etc.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for registering an application at a client computer to a service at a server for later re-authentication, the method comprising:
sending from the servers to the application at the client, a service identifier;
receiving at the server, from the application at the client, an application-service identifier, wherein the application-service identifier is generated at the client based upon the service identifier and an application identifier of the application;
receiving at the server, from the application at the client, a registration nonce and an application-service key, wherein the application-service key is based upon the registration nonce, the service identifier and a secret application key;
storing at the server the registration nonce, the application-service identifier and the application-service key;
computing at the server an expected proof of possession of the secret application key and receiving from the client a proof of possession; and
determining the application is authentic if the expected proof of possession corresponds to the received proof of possession.

2. The method of claim 1, wherein the application-service identifier is a message authentication code generated from the application identifier and the service identifier.

3. The method of claim 1, wherein the application-service identifier is a message digest.

4. The method of claim 1, wherein the application-service key is a message authentication code generated from the service identifier and the secret application key.

5. The method of claim 1, wherein the application-service key is a message authentication code generated from the service identifier, the secret application key and the registration nonce.

6. The method of claim 1, wherein an application is a type of application.

7. The method of claim 1, wherein an application is a specific instance of an application installed on a particular computer.

8. The method of claim 1, wherein an application is a specific instance of a running application.

9. The method of claim 1, wherein: the service identifier is generated at the server and uniquely identifies the service; the application-service identifier uniquely identifies a pairing between the application and the service; and the secret application key is generated at the client for the application.

10. A system comprising: at least one memory to store data and instructions; and at least one processor configured to access the memory and, when executing the instructions, to:

generate a service identifier uniquely identifying a service provided by the system;

sends to an application at a client, the service identifier;

receive, from the application at the client, an application-service identifier, wherein the application-service identifier is generated at the client based upon the service identifier and an application identifier of the application;

receive from the application at the client, a registration nonce and an application-service key, wherein the application-service key is based upon the registration nonce, the service identifier and a secret application key;

store the registration nonce, the application-service identifier and the application-service key;

compute at the server an expected proof of possession of the secret application key and receiving from the client a proof of possession; and determine the application is authentic if the expected proof of possession corresponds to the received proof of possession.

11. The system of claim 10, wherein the application-service identifier is a message authentication code generated from the application identifier and the service identifier.

12. The system of claim 10, wherein the application-service identifier is a message digest.

13. The system of claim 10, wherein the application service key is a message authentication code generated from the service identifier and the secret application key.

14. The system of claim 10, wherein the application-service key is a message authentication code generated from the service identifier, the secret application key and the registration nonce.

15. The system of claim 10, wherein an application is a type of application.

16. The system of claim 10, wherein an application is a specific instance of an application installed on a particular computer.

17. The system of claim 10, wherein an application is a specific instance of a running application.

18. The system of claim 10, wherein: the service identifier is generated at the server and uniquely identifies the service; the application-service identifier uniquely identifies a pairing between the application and the service; and the secret application key is generated at the client for the application.

* * * * *